Feb. 16, 1943.   H. J. MUMMA ET AL   2,311,563
FRUIT MARKING MACHINE
Filed Sept. 16, 1940   6 Sheets-Sheet 4

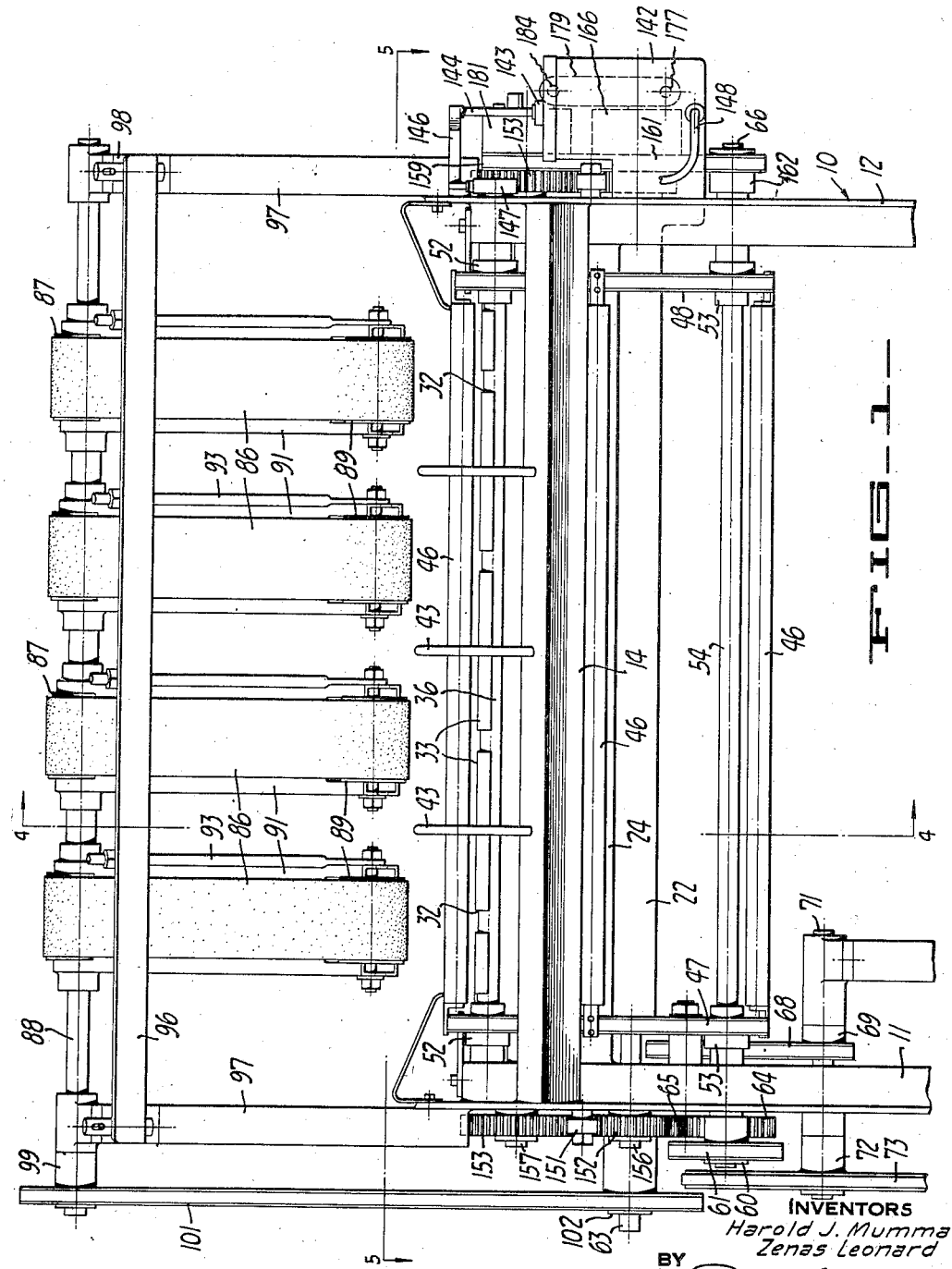

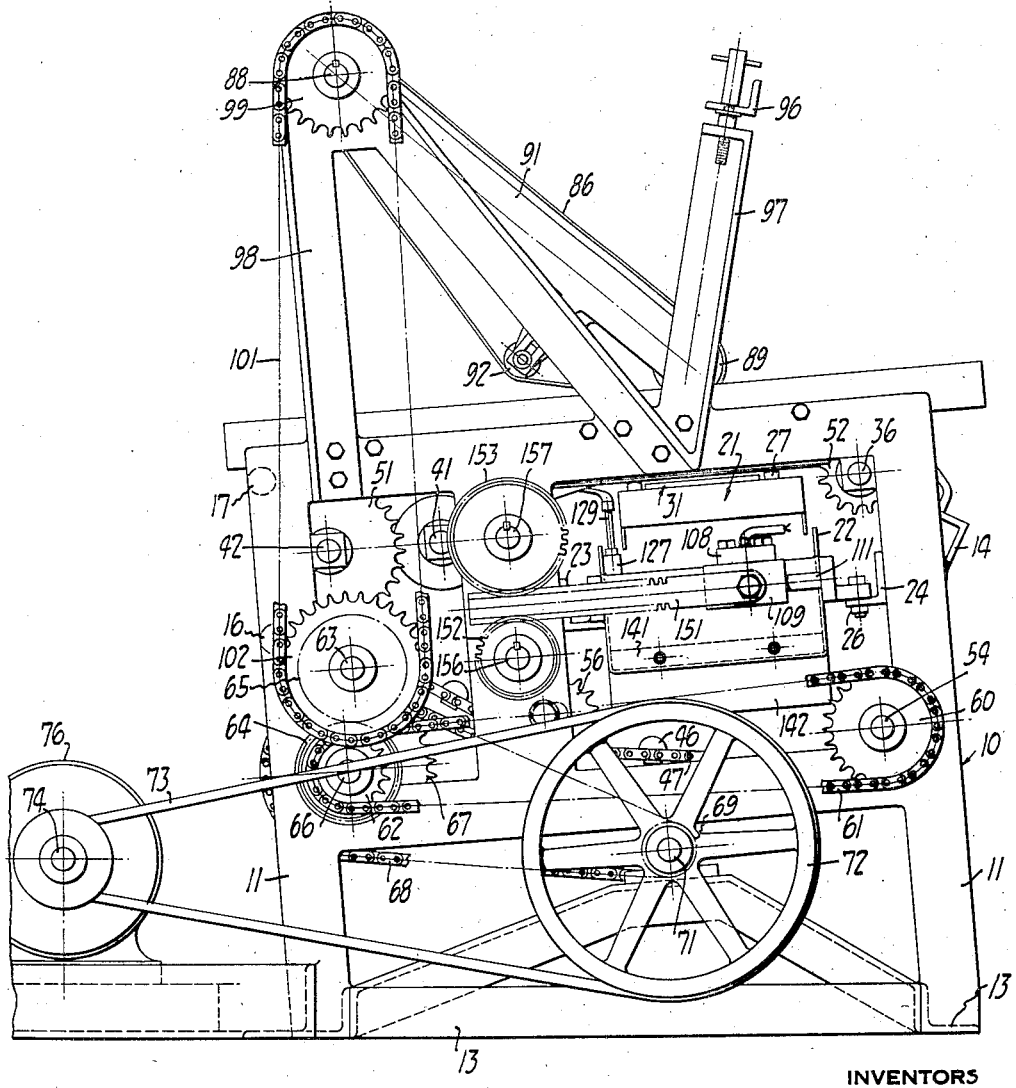

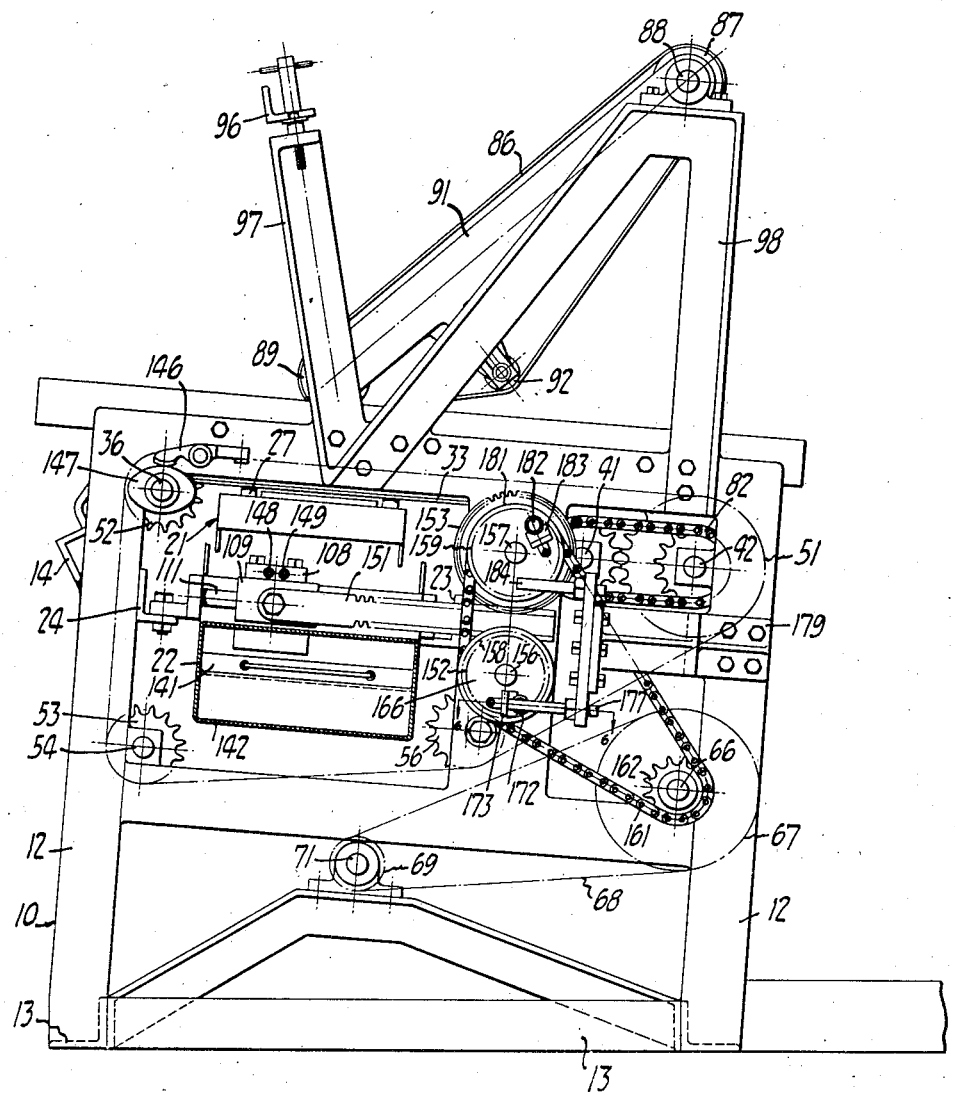

FIG_4_

INVENTORS
Harold J. Mumma
Zenas Leonard
BY
Paul O. Fecher
ATTORNEY

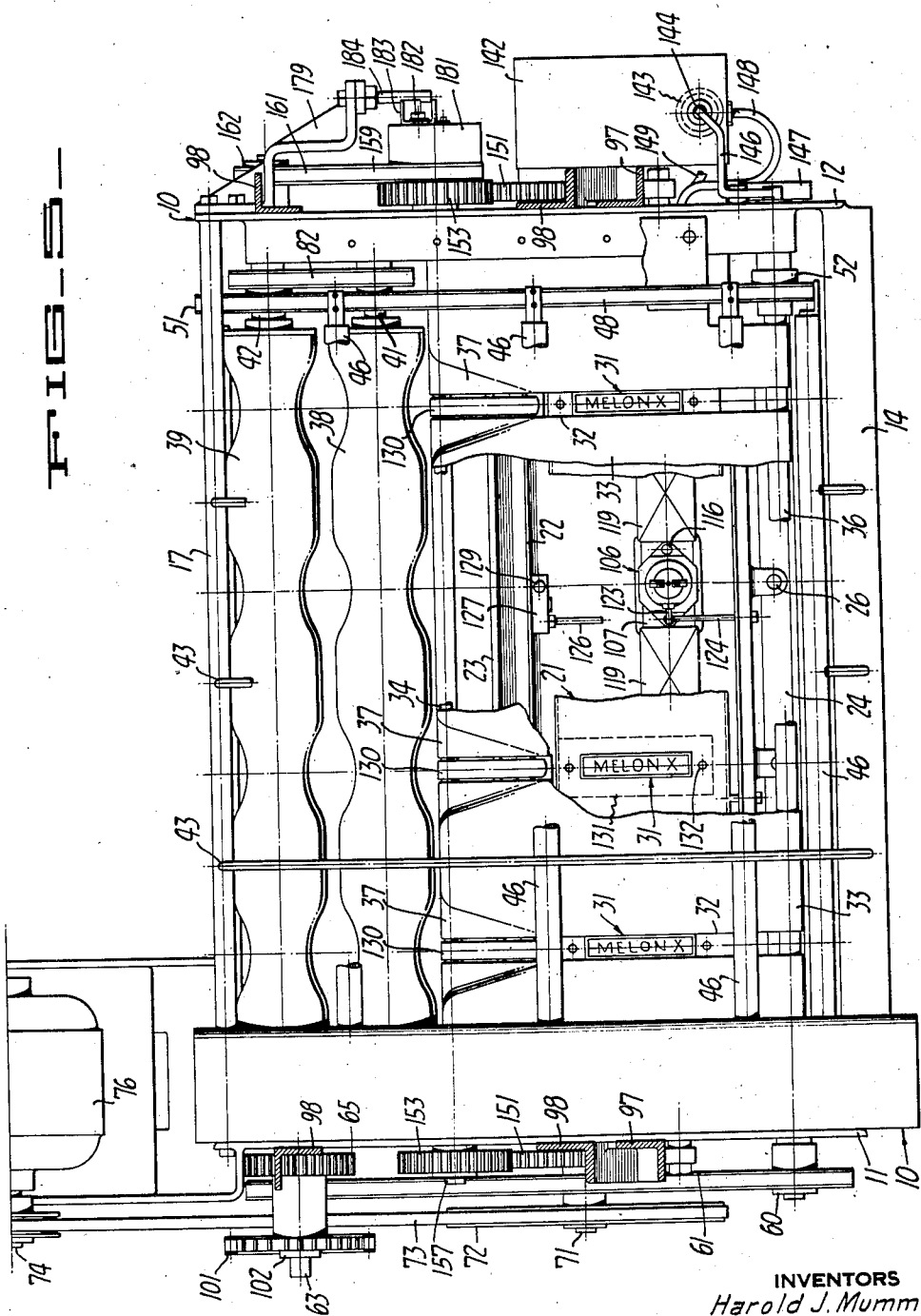

Feb. 16, 1943. H. J. MUMMA ET AL 2,311,563
FRUIT MARKING MACHINE
Filed Sept. 16, 1940 6 Sheets-Sheet 6
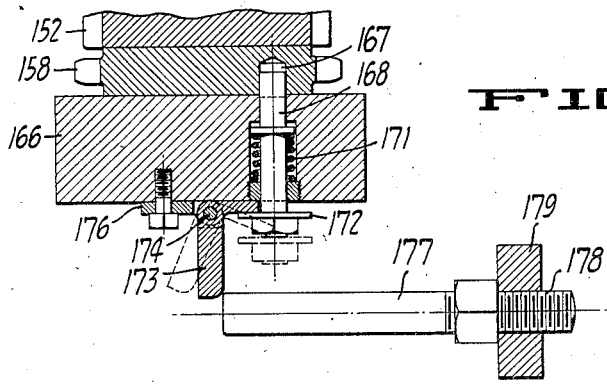
FIG_6_
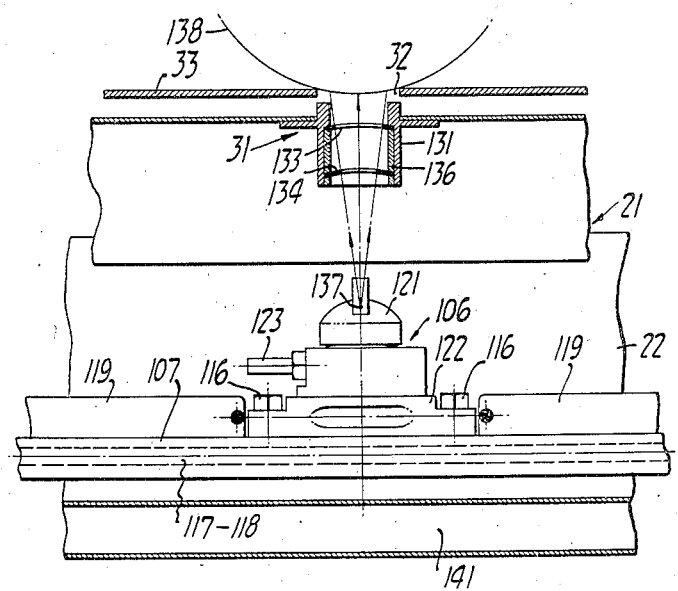 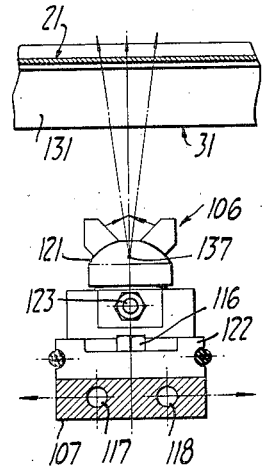
FIG_7_ FIG_8_
INVENTORS
Harold J. Mumma
Zenas Leonard
BY
Paul O. Fischer
ATTORNEY Patented Feb. 16, 1943

2,311,563

UNITED STATES PATENT OFFICE 2,311,563

FRUIT MARKING MACHINE

Harold J. Mumma, Glendale, and Zenas Leonard, Burbank, Calif.

Application September 16, 1940, Serial No. 356,924

12 Claims. (Cl. 101—114)

This invention relates to a method and apparatus of marking fruit and similar articles with desired indicia such as trade names, brands or the like, and is concerned more particularly with the provision of an improved method and apparatus for marking fruit without the application of injurious pressure or force to the fruit.

It is a general object of the invention, therefore, to provide an improved method and apparatus for marking fruit.

Another object of the invention is to provide an improved method and apparatus of marking fruit whereby a spray application of the desired indicia is effected.

Another object of the invention is to provide an improved method and apparatus for marking fruit whereby a large volume of fruit can be handled in a given length of time while applying the desired indicia to the fruit in a simple and economical manner without injury to the fruit.

Another object of the invention is to provide an improved apparatus and method of marking fruit whereby the desired indicia is spray stencilled on the fruit by the use of a hot marking ink which is solid at normal atmospheric temperatures so that when the hot spray contacts the fruit it is immediately cooled and hardened.

Other objects and advantages of the invention will be apparent from the following description of a preferred embodiment of a machine for carrying out the method as illustrated in the accompanying drawings, wherein Figure 1 is an elevational view of the discharge or rear side of the marking machine;

Figure 2 is an end elevational view of the machine taken from the left side of Figure 1;

Figure 3 is an end elevational view taken from the right side of Figure 1;

Figure 4 is a vertical sectional view partially in elevation, the view being taken in the plane of the line 4—4 in Figure 1;

Figure 5 is a sectional plan view of the machine partly broken away, the view being taken as indicated by the line 5—5 in Figure 1;

Figure 6 is a fragmentary sectional view taken in the plane indicated by the line 6—6 in Figure 3;

Figure 7 is an enlarged sectional view illustrating the relation of one of the spraying heads to the cooperating stencil and a piece of fruit which is being marked. The view is taken generally in a plane at a right angle to the plane of Figure 4;

Figure 8 is a fragmentary enlarged view similar to Figure 4 illustrating the relation of one of the spray heads to its cooperating stencil.

Generally, the apparatus and method of my invention is designed to apply the desired indicia, such as a trade or brand name, by means of spray stencilling. In this way, the desired indicia can be applied in a gentle manner without injury to the fruit such as would occur with ordinary die pressure marking methods.

It is preferred to employ a marking medium such as a marking ink which is solid at ordinary atmospheric temperatures to make a spray application of the ink while it is hot and in a liquid state so that the ink will immediately cool and harden upon contact with the fruit being marked. To make a clear and distinct marking, it is desirable to interpose a marking stencil between the spray head and the fruit, so that the spray passing through the stencil will be in a design corresponding to the desired indicia. With certain types of fruit, as for example, melons and similar rollable fruit, it is preferred to roll the fruit past one side of the stencil and to cause the spray head to travel synchronously along the opposite side.

Referring to Figures 1 to 5, a preferred machine for carrying out our method is disclosed, such machine including means for feeding a plurality of rows of fruit past a series of marking stations extending transversely with respect to the direction of travel of the rows of fruit. Beneath each marking station, a spray head is arranged for travel in the direction parallel to the rows of fruit and for synchronous movement therewith whereby as the fruit is rolled past the stencil the spray traveling underneath the stencil at the same rate of speed projects the marking ink through the stencil onto the fruit in an even, accurate design.

The machine includes a frame 10 (Figures 1 to 4) including respective end standards 11 and 12 which are suitably connected by base angles 13, cross angle 14, and respective tie rods 16 and 17, to provide a rigid frame construction.

Extending between the end standards 11 and 12 (Figures 2 to 5) is a stencil frame 21 of inverted U-shaped cross section and positioned above a tank 22 which has its upstanding side walls spaced outwardly from and in vertical overlapping relation with respect to the side walls of the frame 21. The tank 22 (Figures 2 to 4) is detachably supported on cross angles 23 and 24 of the frame by means of suitable bolts 26, while the stencil frame 21 is detachably secured at its ends by means of bolts 27 (Figure 3) to the respective end standards 11 and 12.

The stencil frame 21 (Figure 5) carries a plurality of suitably set stencils 31 which extend transversely of the length of the frame 21 and are described more particularly hereinafter. Each of the stencils 31 is placed at one of the fruit marking stations below a gap or slot 32 formed between adjacent inclined fruit supporting plates 33 (Figures 4 and 5) which are pivotally attached at one end on a transverse supporting rod 34 and have their opposite curved ends resting on a cross shaft 36 referred to hereinafter. As seen most clearly in Figures 4 and 5, the adjacent pair of plates 33 cooperating to form a slot 32 have their adjacent edges bent downwardly as at 37 to form a fruit guiding trough leading from a pair of adjacent fruit feeding and aligning rolls 38 and 39 suitably secured on respective shafts 41 and 42. Rolls 38 and 39 are provided with a series of arcuate grooves which are in alignment with the respective trough forming portions 37 of the fruit supporting plates 33 for feeding fruit thereto, as will be described hereinafter.

Rows of fruit may be fed by any suitable form of conveyor to the rolls 38, 39 in alignment with the grooved portions thereof and between separating rods 43 extending from frame angle 14 to tie rod 17 to define the paths of movement of the rows of fruit through the machine. Fruit feeding means is provided to pick up the fruit from the rolls 38, 39 and carry it over the plates 33 past the marking stations. In the embodiment shown, the fruit feeding means comprises a series of parallel bars or rollers 46 (Figures 1, 4, and 5) extending between respective chain 47, 48 which are similarly mounted and driven. As seen in Figure 4, chain 48 is trained about idler sprocket 51 on shaft 42, sprocket 52 on shaft 36, driving sprocket 53 on shaft 54, and is also engaged by idler sprocket 56 suitably journaled on the frame. Chain 47 is similarly mounted.

Sprockets 53 (Figure 2) and shaft 54 are rotated in a clockwise direction by means of sprocket 60 secured on shaft 54 and chain 61 from driving sprocket 62 on shaft 66. Shaft 66 which carries a large sprocket 67 is driven through chain 68 from a sprocket 69 on drive shaft 71. Drive shaft 71 carries a pulley 72 which is driven through belt 73 from a suitable pulley on the shaft 74 of motor 76.

From the above description, it is seen that the bars 46 carried by the chain 47, 48 will pick up fruit on the rolls 38 and 39 and carry them over the plate 33 past the stencils 31. The rolls 38 and 39 are driven to align and center the fruit before it is picked up and advanced by the fruit feeding means, the roll 39 rotating with its shaft 42 while the roll 38 is connected to the roll 39 for rotation in the same direction by means of a suitable chain and sprocket drive connection 82 (Figure 5).

As seen most clearly in Figure 4, the upper traverse of the fruit feeding bars 46 is along a path inclined upwardly from the horizontal and the feeding rolls 39 and 38 are spaced below the level of the plates 33. Thus the rotation of the rolls 38 and 39 is not in itself sufficient to feed the fruit onto the plates 33 but merely serves to rotate the fruit as it is on the rolls to cause its longitudinal axis, if any, to align itself with the axes of the rolls so that the fruit will be rolled along its axis as it travels over the plate 33. Also the rolls 38, 39 serve to center the fruit with reference to the adjacent plates 33 so that it will roll evenly along the plates over the cooperating slot 32 therebetween.

In order to accurately control the travel of the fruit and its rotation over the plates 33, the fruit feeding means also includes a floating fruit-engaging feeder for each row of fruit, in the form of belt 86 (Figures 1 to 4) trained about drive roller 87 on transverse shaft 88 and idler roll 89 and adjustably rotatably mounted at the end of an arm 91 pivoted on shaft 88. Arm 91 adjustably supports idler roll 92 which is spaced from the roll 89 and provides a stretch of the belt 86 spaced from and convergent with respect to the adjacent plates 33. In order to limit the downward position of the respective belts 86, each arm 91 has pivotally connected thereto an upwardly extending rod 93 having an adjustable rubber stop 94 adapted for engagement with apertured transverse angle 96 adjustably supported on the respective bracket arms 97 from the end standards 11 and 12. By adjusting the positions of stops 94 on their respective rods 93 the vertical position of belts 86 can be adjusted individually, while the adjustable mounting of angle 96 provides for simultaneous adjustment of the belts.

The shaft 88 on which the driving rollers 87 are secured is suitably journaled on respective brackets 98 extending upwardly from end standards 11 and 12 and carries a sprocket 99 (Figure 2) which is driven through chain 101 from sprocket 102 on shaft 63. Shaft 63 carries gear 65 meshing with gear 64 on shaft 66. Thus, the belts 86 which floatingly engage the fruit as it is carried along by the feed bars 46 engage the fruit and cause it to roll along the plate 33 in timed relation to the traverse of the bars 46 and also to the action of the spray head associated therewith as will now be described.

As seen most clearly in Figures 4, 5, and 7, below each stencil 31 a spray head 106 is provided which is detachably mounted on a head-carrying bar 107 which extends the length of the tank 22 and is supported by end brackets 108. Each bracket 108 (Figure 2) is suitably secured on a bearing block 109 slidably engaged with a rod 111 supported at its ends on the tank 22. The bar 107 and spray heads 106, therefore, are mounted below the stencils 31 for back and forth sliding movement parallel to the direction of travel of the fruit as will be described in detail hereinafter.

As seen in Figure 7, each spray head is detachably secured on the bar 107 by means of suitable securing bolts 116 so that its air and ink passages are in registry with respective ink and air passages 117 and 118 of the bar 107 which are supplied in a manner latter described. In order to heat the ink and air, between each pair of adjacent spray heads 106, a suitable electric heater element 119 may be provided.

The spray heads 106 are of conventional design of the type known in the trade as "Crown" spray head, model 22, No. 1. Each head includes a nozzle member 121 (Figure 7) which is mounted on a base 122 and is opened or closed by being rotated relative to the base. For this purpose, each nozzle 121 is provided with a laterally projecting pin 123 (Figures 4 and 5) which is adapted to cooperate with a fixed control pin 124 on one side of tank 22 and a vertically adjustable control pin 126 on the other side of the tank. Each pin 126 is attached to a sliding block 127 slidably mounted on a wall of the tank 22 and urged to its upper position by spring 128.

At its upper end, block 127 carries an upstanding pin 129 which is adapted for engagement with the end of a trip lever 130 pivoted on rod 34 between the adjacent plates 33.

As seen in Figure 4, the trip 130 extends up into the trough formed by the depressed portion 37 of the adjacent plates 33 so as to be depressed by a piece of fruit traveling toward the marking station. In this way each pin 126 will be moved downwardly by the next piece of fruit to be marked to its dotted line position shown in Figure 4 in the path of the control pin 123 of the cooperating spray head 106. The arrangement is such that as the fruit begins its travel over the stencil 31, the spray head will have started its return movement from the end position where its pin 123 is engaged by the control pin 126 to open the nozzle. The nozzle will remain open until the spray head reaches the position shown in Figure 4 (the end of its travel), where the fixed pin 124 engages the pin 123 and again closes the spray head.

As seen in Figures 5 and 7, each stencil 31 includes a cast frame 131 which is secured in an aperture of the stencil frame 21 by means of suitable fastening bolts 132. The respective stencil plates 133, 134 of each stencil are suitably secured within the frame 131 by means of suitable spacers 136 in vertically aligned relation and with a transverse curvature struck from the focal center 137 of the spray. The respective stencil plates 133 and 134 may be formed of metal in the usual fashion in making stencils with the exception that the lower stencil 134 has a shorter dimension lengthwise of the letters of the stencil, corresponding to the desired arc of spray which is to be transmitted to the fruit. By providing the spaced apart stencil plates 133, 134, only straight traveling particles of marking ink are allowed to pass through both of the stencils, so that an accurate design of sharp outline is applied to the fruit indicated at 138. The character of the spray from the nozzle 121 may be controlled in the usual fashion by angular adjustment of the nozzle tip.

Excess ink from the spray which drains back into the tank 22 is maintained liquid by heating element 141 secured to the bottom of tank 22. The ink drains down the inclined bottom wall of the tank 22 to a sump 142 (Figures 1 and 4) formed at one end thereof. The sump 142 is also supplied with suitable heating means to maintain the marking ink liquid therein. Liquid from the sump is applied to the sprayheads by a pump 143 of conventional construction which has its plunger rod 144 (Figures 1, 3, and 5) operated by a rocker arm 146 from a cam 147 on shaft 36. The discharge of the pump 143 is connected by a suitable flexible conduit 148 to the passage 117 for ink in the spray head bar 107, while the passage 118 for air is connected to a suitable source of compressed air by means of a flexible conduit 149 (Figure 5).

In order to provide for the back-and-forth movement of the spray head bar 107, the bar has its respective bearing blocks 109 (Figures 2 and 3) connected to double racks 151. Each rack 151 (Figure 3) meshes with respective gears 152, 153 secured on respective shafts 156 and 157. Journaled on shafts 156 and 157 are respective sprockets 158, 159 which are engaged by a common chain 161 meshing with a sprocket 162 ond shaft 66. Sprockets 158 and 159 are driven in the same direction and can be selectively connected to the adjacent gears 152 and 153 to drive the rack 151, and thereby the spray head bar, back and forth in a timed relation to the operation of the feeding means.

The drive connection between the gears 152, 153 and their respective sprockets 158 and 159 are similar in construction and operation, the greater pitch diameter of the gear 153 serving to provide a faster return for the rack 151 than the feed by the gear 152 during the spraying stroke of the heads.

Referring to Figure 6, the gear 152 which is fixed on the shaft 156 is disposed in side-by-side relation with the sprocket 158 which is journaled on the shaft between the gear 152 and clutch disc 166 also fixed on the shaft. The sprocket 158 has a clutch recess 167 for engagement by clutch pin 168 carried by the clutch disc 166 and spring-urged to clutching position by a spring 171. The outer end of clutch pin 168 is provided with a flanged nut 172 which is engaged by one arm of a bell crank 173 pivoted at 174 on bracket 176 secured on the clutch disc. As seen in Figures 3 and 6, the projecting arm of bell crank 173 is adapted for engagement by a fixed stop 177 adjustably secured at 178 on a bracket 179. Gear 153 (Figure 3) and sprocket 159 are similarly provided with a clutch disc 181 having a clutch pin 182 controlled by a bell crank 183 adapted for engagement by stop pin 184.

In the position shown in Figures 3 and 6, the bell crank 173 is just engaging the stop 177 so it will be rocked to the dotted line position shown in Figure 6 to withdraw the pin 168 from its recess 167 in the sprocket and interrupt the drive from the sprocket 158 through clutch disc 166 and the shaft to gear 152, so that the drive from gear 152 to the rack 151 is interrupted at the end of the spraying stroke of the bar 107, as shown in Figure 3. At about this time the recess in sprocket 159 corresponding to recess 167 in the sprocket 158 is aligned with the pin 182 so that this pin snaps into place under the urgency of its spring. Thus the sprocket 159 becomes effective to drive disc 181, shaft 157 and gear 153 and return the rack 151 to the right from the position shown in Figure 3. The spray head bar is thereby returned as a preliminary to another spraying stroke. This operation also serves through the rack 151 to turn the gear 152 and clutch collar 166 in a clockwise direction from the position shown in Figure 3 during the time that the bell crank 183 is traveling from the position shown in Figure 3 in a counterclockwise direction to engage the pin 184. Immediately after the bell crank 183 engages the stop 184 to withdraw the clutch pin 182 and to interrupt the drive for the gear 153, sprocket 158 will have been rotated to align its recess 167 with pin 168 so that this pin is seated and will drive the disc 166 in a counterclockwise position until it reaches the position shown in Figure 3, when the drive for the gear 153 will be enabled.

It is seen, therefore, that an alternatively enabled drive is provided to produce a back-and-forth movement of the racks 151 and the spray heads. This back-and-forth movement of the spray heads is in a timed relation to the operation of the feed means so that the spray heads become effective as the fruit starts rolling past the stencils 31 and is maintained effective throughout their travel beyond the stencil, when the spray will be shut off and the spray carriage or bar will be returned in a rapid manner to start back again with the next fruit to be marked.

In operation, the sump 142 is provided with a supply of suitable marking ink as, for example, an ink made up in the following proportions by weight: beeswax—12 parts; candelilla wax—12 parts; rosin—3 parts; coloring matter—2 parts; 138 to 140° paraffin—6 parts. A marking ink of this character will be liquid at about 180° F. but solid at ordinary temperatures. The heating elements for the sump 142, the tank 22 and the spray head bar 107 are turned on so that the machine will reach a desirable temperature to maintain the ink liquid until it is projected from the nozzle, for example, these parts should be heated to from 180° F. to 250° F. Preferably, the air supplied to the spray head bar is also heated to a temperature say, in the neighborhood of 300° F., so that when the air is discharged from the nozzle, it will not cool sufficiently before reaching the fruit to cause hardening of the marking ink.

The machine is then put in operation with fruit such as melons and cantaloupe being fed to the respective grooves of the rollers 38 and 39 where the turning of the rollers serves to align the fruit with its longitudinal axis parallel to the axes of the rolls and in centered relation with respect to the stencils. Pieces of fruit are successively picked up by one of the bars 46 and fed to the plates 33 which are spaced above the adjacent stencils 31. As the fruit passes over the trip 139, it moves the trip downwardly to position the pin 126 in the path of the pin 123 of the adjacent spray head so that as the fruit is passing over the trip and the spray head reaches the end of its travel to the left as viewed in Figure 4, the feed for the air and ink is turned on in the spray head. As the spray head starts to the right as viewed in Figure 4 and the fruit is traveling in the same direction and at the same speed under control of the adjacent bar 46, the spray is started directly under the center of the rolling fruit. At the end of the travel of the spray head, pin 123 engages the fixed stop 124 which shuts off the nozzle at the end of the spraying operation while the fruit is discharged from the machine.

Because of the provision of the spaced-apart stencil plates 134 and 133, shown in Figures 7, the fruit can travel through the machine at a substantial distance above the stencil, while the spaced apart stencils restrict the spray which passes through to spray particles which are traveling substantially straight and which will fall within an accurately outlined reproduction of the design on the fruit. Thus the fruit can be marked clearly with a clear cut pattern without contacting the stencil, so that the stencil need not be cleaned between successive operations. The stencil remains sufficiently hot or, if desired, can be heated, so that the excess ink thereon remains liquid and drains back to the tank 22 and flows into the sump 142 for re-use.

The above cycle of operation is repeated as each successive piece of fruit is picked up by one of the feed bars 46 and carried past a marking station. Because of the continuous type of operation, and the adaptability of the construction to multiple row marking, a large number of fruit can be marked in a short time at a small cost with a spray-applied brand name.

We claim:

1. A fruit marking machine comprising a frame, a marking station on said frame including a stencil cut to the desired indicia, means for establishing a spray marking ink including a spray head, means for carrying said spray head repeatedly past one side of said stencil, and means for feeding fruit past the other side of said stencil in timed relation to the movement of said spray head.

2. A fruit marking machine comprising a frame, a marking station on said frame including a stencil cut to the desired indicia, means for establishing a spray marking ink including a spray head, means for carrying said spray head back and forth along said stencil, means for feeding fruit past the other side of the stencil with the pieces of friut moving in timed relation to the back-and-forth movement of the spray head, and means for interrupting the operation of the spray head during one direction of its travel along said stencil.

3. A fruit marking machine comprising a frame, a marking station on said frame including a stencil cut to the desired indicia, an adjustable spray head, means for carrying said spray head back and forth along said stencil, means for feeding fruit past the other side of the stencil with the pieces of fruit moving in timed relation to the back-and-forth movement of the spray head, means disposed adjacent one end of the path of back-and-forth movement of the spray head to adjust the spray head to open condition, and means disposed adjacent the other end of said path to adjust the spray head to closed condition.

4. A fruit marking machine comprising a frame, a marking station on said frame including a stencil cut to the desired indicia, means for establishing a spray marking ink including a spray head, means for carrying said spray head back and forth past one side of said stencil, said carrying means including means for moving the spray head at a more rapid rate in one direction of its travel, and means for feeding fruit past the other side of said stencil during the movement of said spray head in said other direction and at the same rate of travel as the spray head.

5. A fruit marking machine comprising a frame, a marking station on said frame including a stencil cut to the desired indicia, means for establishing a spray marking ink including a spray head, means for carrying said spray head back and forth along one side of said stencil, a fixed stop at one end of the travel of said spray head for operating said spray head to cut off the spray of marking ink therefrom, and an adjustable stop at the other end of said path of movement for operating said spray head to initiate spraying of marking ink therefrom.

6. A fruit marking machine comprising a frame, a marking station on said frame including a pair of parallel stencil plates both cut to the desired indicia, a spray head disposed to spray marking ink through said stencil plates, said stencil plates each having a curvature in one direction which is concentric with the focal point of the spray from said spray head and the stencil plate nearest the spray head having a shorter dimension of its indicia in the direction of said curvature, and means for supporting fruit at said marking station with said fruit spaced from the adjacent one of said stencil plates.

7. A fruit marking machine comprising a frame, a series of marking stations on said frame, each station including a stencil cut to the desired indicia, a tank disposed below said marking station, a spray head bar mounted for back and forth movement within said tank, said bar having a spray head thereon for each of said marking stations, means for supplying marking ink and air under pressure to said bar, said bar having passage means communicating with each of said spray heads, and individual adjusting means for each of said spray heads mounted in said tank, each of said adjusting means being responsive to the travel of fruit along the associated marking station for rendering the associated spray head operative.

8. A fruit marking machine having a frame, a series of marking stations on said frame, each station including a stencil cut to the desired indicia, a spray head for each of said marking stations, and means for supplying marking ink to said spray heads; means for feeding fruit to the machine including a pair of aligning rolls for centering and positioning the fruit ahead of said marking stations and conveying means for picking up fruit from said aligning rolls and carrying it past said marking stations.

9. A fruit marking machine having a frame, a series of marking stations on said frame, each station including a stencil cut to the desired indicia, a spray head thereon for each of said marking stations, and means for supplying marking ink to said spray heads; means for feeding fruit to the machine including a pair of aligning rolls for centering and positioning the fruit ahead of said marking stations and conveying means for picking up fruit from said aligning rolls and carrying it past said marking stations, said fruit feeding means also including a floating element adapted to be engaged by the fruit as it is carried by said feeding means and to thereafter assist in feeding and controlling the fruit is traveling past said marking stations.

10. A method of marking articles such as fruit which includes the steps of moving fruit along a path past one side of a stencil, establishing a spray of marking ink on the other side of the stencil, and moving the spray past the stencil synchronously with the passage of fruit past the stencil.

11. A method of marking articles such as fruit which includes the steps of rolling fruit over a stencil, establishing an upwardly directed spray of marking ink below the stencil, and moving the spray past the stencil synchronously with the passage of fruit over the stencil.

12. A method of marking articles such as fruit which includes the steps of carrying pieces of fruit in succession along a path past a stencil, and establishing successive sprays of marking ink directed through the stencil onto the fruit with each successive spray traveling along the stencil at the same speed as the fruit.

HAROLD J. MUMMA.
ZENAS LEONARD.